United States Patent [19]

Becker, III

[11] 4,055,362
[45] Oct. 25, 1977

[54] BUMPER ASSEMBLY FOR A ROLLING CART

[75] Inventor: Frederick R. Becker, III, Dallas, Pa.

[73] Assignee: Metropolitan Wire Corporation, Wilkes-Barre, Pa.

[21] Appl. No.: 697,699

[22] Filed: June 18, 1976

[51] Int. Cl.² ........................................... B60R 19/02
[52] U.S. Cl. ..................................... 293/62; 293/88
[58] Field of Search ................... 293/62, 21, 63, 75, 293/76, 88, 99, 71 R, 72, 1, 22, 60, 65, 69 R, 87, 97, 98, 91–96; 224/42.03 R, 42.04; 280/34 B, 106; 52/716

[56] References Cited

U.S. PATENT DOCUMENTS

| 2,624,607 | 1/1953 | Weigand | 293/65 |
| 2,986,419 | 5/1961 | Barenyi | 293/62 |
| 3,110,515 | 11/1963 | Loftin | 293/62 |

Primary Examiner—Trygve M. Blix
Assistant Examiner—Douglas C. Butler
Attorney, Agent, or Firm—Friedman, Goodman & Teitelbaum

[57] ABSTRACT

In a rolling cart assembly, a smooth bumper assembly is provided that minimizes the likelihood of trapping dirt, grime, or the like. Corner bumper members having a smooth, uncrimped outer surface are provided with integral stiffening members and internally secured nuts so that the corner bumper members may be secured to a support frame by fasteners that extend in an outwardly direction from the inside surface of the support frame. Since the nuts are completely enclosed by the corner bumper members, the outside surface thereof are smooth and unbroken. Stiffening members may be co-molded or otherwise suitably formed integrally with and interiorly of the corner bumper members. Longitudinally extending side and end bumper strips are formed with an opening therein in order to receive V-shaped stiffening members. The side and end bumper strips are also secured to the support frame by fasteners that extend in an outward direction from the inside surface of the support frame so that the outside surface of the side and end bumper strips are also smooth and unbroken.

17 Claims, 7 Drawing Figures

U.S. Patent  Oct 25, 1977  4,055,362
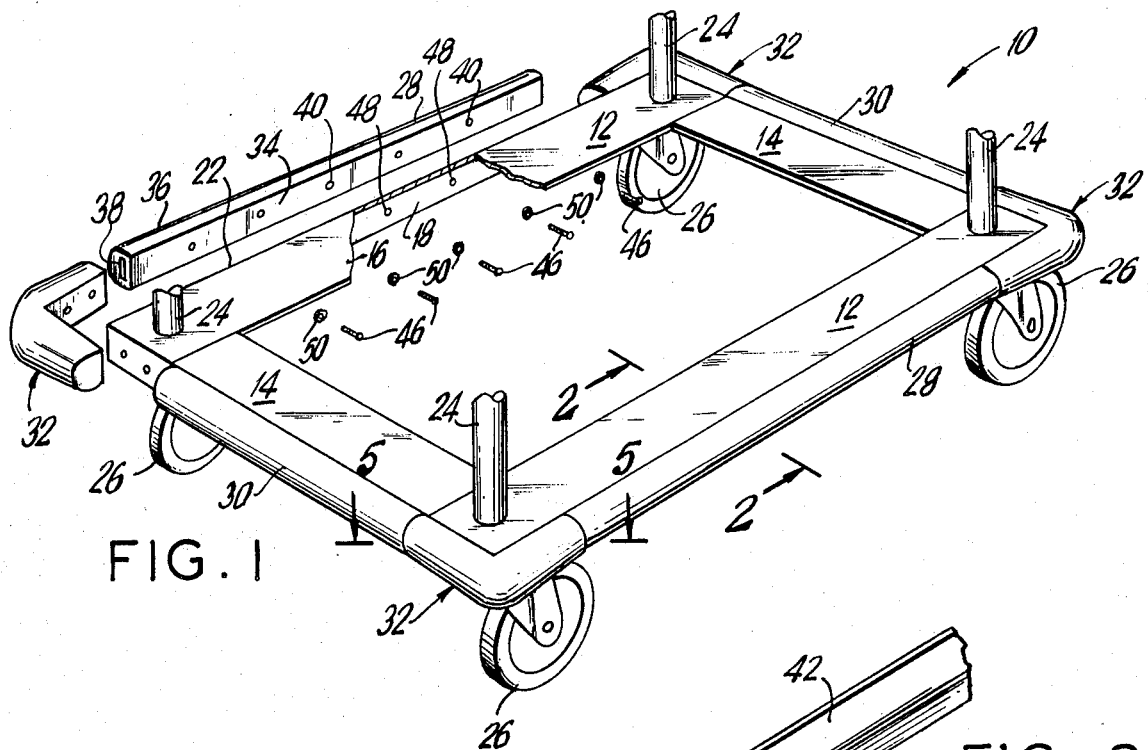
FIG. 1
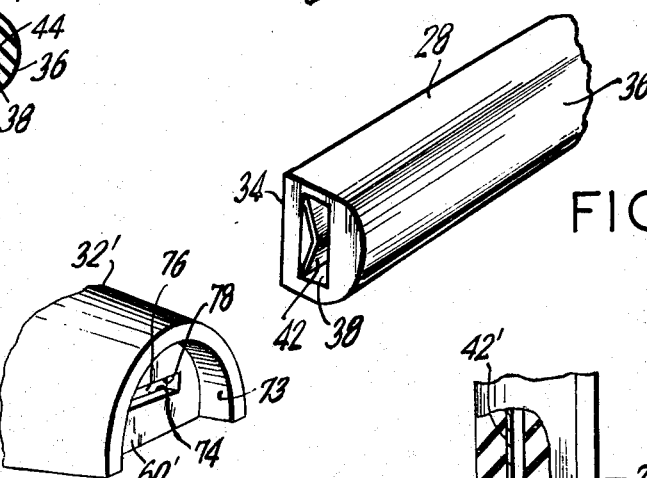
FIG. 2
FIG. 3
FIG. 4
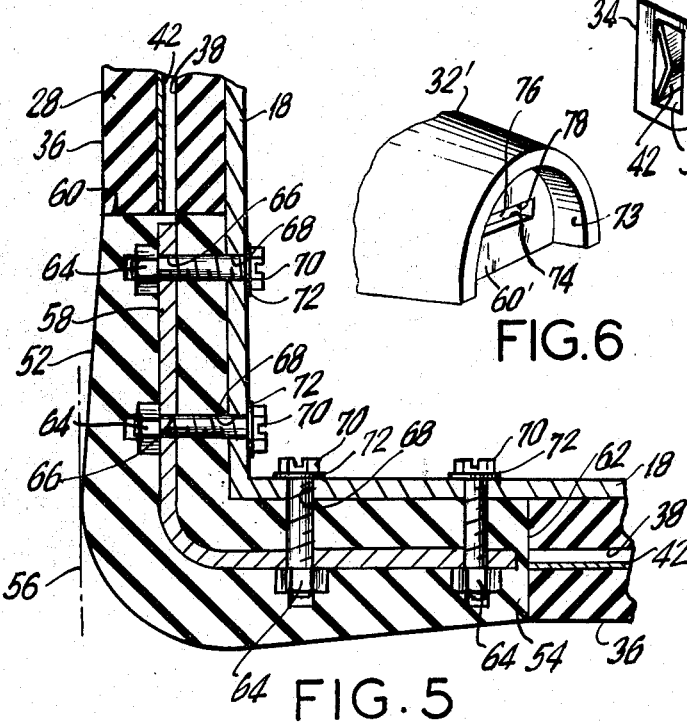
FIG. 5
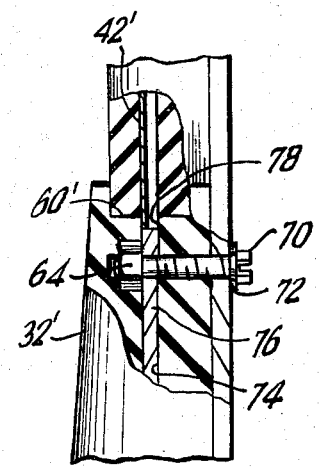
FIG. 6
FIG. 7

BUMPER ASSEMBLY FOR A ROLLING CART

BACKGROUND OF THE INVENTION

1. Field of the Invention

This invention relates generally to rolling carts or the like and more particularly to an improved bumper assembly therefor.

2. Description of The Prior Art

Rolling carts, of the type to which the present invention is directed, are frequently used in environments where sanitary requirements are of the highest order. For example, various types of rolling carts are used in hospitals for transporting medicines, linens, catheters, surgical and diagnostic tools, food, I.V. units, baskets and the like. Because of its environment, the rolling cart should be kept as clean as possible and should of course be susceptible to low cost maintenance procedures that will avoid or at least minimize the likelihood of contamination. The rolling carts must necessarily be highly mobile and are therefore provided with resilient bumpers to prevent damage of the contents of the truck and to prevent damaging walls and doors should the trucks be inadvertently mishandled. It has been found that one common source of contamination resides in the resilient bumper means since these bumper means, at least those which surround the lowermost support frame, are fairly close to ground level.

Those working in the field have recognized the problem and have attempted to provide solutions therefor but they have been generally unsuccessful, at least to the extent of providing rolling cart bumper means having smooth and unbroken surface areas that are less likely to attract and retain contaminants.

For example, one form of prior art utilized a length of a resilient material that was wrapped around and suitably secured to a support frame. It was found, however, particularly as a result of formation of the corners, that the resilient material would bunch up and would therefore present ridges or grooves that easily attracted contaminants and which were difficult to clean. Moreover, with this first type of prior art bumper there was the problem of the resilient material cracking at the corners, particularly after extended usage. The cracks in the corners, of course, would easily accommodate small particles of dirt which could then become packed in and therefore very difficult to clean. In addition, the cracked and worn corners of this first type of prior art bumper was unsightly. It should be further noted that where bumpers are adhesively secured, they are difficult to replace without considerable skill and special equipment.

In order to overcome the problem inherent in the first form of prior art structure described hereinabove, molded side and end resilient bumper strips were provided in combination with molded, L-shaped corner bumper members. The molded bumper strips and the molded corner bumper members, represented by this second form of prior art were fastened to the support frame by means of threaded fasteners. In order to accommodate the shanks and heads of threaded fasteners, the prior art bumper strips and bumper corner members were suitably counterbored. While the molded corner bumper members did overcome the problem of cracking at the corners of the bumper assembly, still another problem was raised by the counterbored holes.

Obviously, if the counterbored holes are to receive fasteners, both of the diameters of the counterbored holes must be larger than the head of the fastener and the shank of the fastener. This is to accommodate normal tolerances in both the molding operation of the corner bumper members and the normal tolerance variations found in fasteners. Because the two diameters in the counterbored holes must necessarily be oversized in order to permit easy insertion and removal of the fasteners, the resulting play of the fastener in its respective counterbored hold provided recesses that could very easily accommodate dirt particles. In addition, it will be readily apparent that it was extremely difficult to maintain the oversized, counterbored holes in a clean condition.

A further problem inherent in the prior art molded corner bumper means also relates to the oversized holes that were required for the fasteners. Because the holes were oversized there would necessarily be some limited movement of the molded corner bumper means with respect to the support frame and to the adjacent side and end bumper strips and this too resulted in crevices that could easily accommodate dirt particles. In addition, if the fit of the corner bumper means with respect to the size and end bumper strips was sloppy, as was frequently necessitated by virtue of the oversize, counterbored holes, there would be some loss of aesthetic appeal as well.

SUMMARY OF THE INVENTION

The present invention overcomes the shortcomings inherent in the prior art by providing support means in the form of an open frame that is defined by pairs of elongated spaced apart side sections and end sections. The support frame is open and, for purposes which will be made evident from the following description, includes inside and outside peripheral surfaces. Pairs of resilient side bumper strips and end bumper strips are secured to the side and end sections of the support means by fasteners having heads which bear against the inside surface of each of the support means sections and which extend in a direction generally outwardly of the support means. The side and end bumper strips may be tubular and may be provided with generally V-shaped, elongated stiffening means internally thereof so that the fasteners may be threaded therein. Self-tapping fasteners may be used for this purpose.

It should be noted that the side and end bumper strips have a length less than the length of the side and end sections of the support frame in order to accommodate molded resilient corner bumper means intermediate the adjacent ends of pair of side and end bumper strips. The molded corner bumper members are provided with integral, internal and non-rotatable nuts in order to receive fastener means that extend in an outward direction from the inside surface of the side and end frame section. In this manner, the need for counterbored holes from the outside surface, such as taught by the prior art, is obviated.

In addition, the corner bumper members comprising the present invention may be provided with internal stiffening means in the form of an elongated generally L-shaped metal strip. The stiffening means in one embodiment of the present invention are provided with holes therethrough that are in alignment with the holes formed in the side and end frame sections of the support means in order to receive the shank of the fasteners that secure the corner bumper members to the side and end frame sections. In one illustrated embodiment of the present invention, the internal nuts are first welded or otherwise suitably secured to the stiffening member and are thus non-rotatably positioned. Therefore, the corner bumper members, as well as the side and end bumper strips, may be secured to the support means without the need for counterboring a large number of holes.

In the first embodiment of the present invention, the stiffening member is totally encapsulated by the corner bumper members. That is, the ends of the stiffening means terminate inwardly of the end faces of the corner bumper means. In an alternative embodiment of the present invention, the opening in which the stiffening means is positioned is continuous from one end face of the corner bumper means to the other and the stiffening means terminate inwardly of the end faces of the corner bumper means in order to define recesses therein. The stiffening means utilized in connection with the side and end bumper sections may then be made to extend slightly beyond the side and end bumper sections in order to be accommodated in the recesses in the end faces of the corner bumper means.

A further embodiment, which may be utilized with either of the above-mentioned two embodiments, is to provide a cavity in the ends of each corner bumper member to receive the ends of the side and end bumper sections therein. This feature provides a more sanitary condition as the butt joint between the corner bumper member and the bumper sections is now covered. Furthermore, the opening in these bumper sections and the recesses in the corner bumper member are more effectively sealed to prevent dirt, water and vermin from lodging therein.

Regardless of whether or not the stiffening means in the side and end bumper sections extend into the recesses in the corner bumper means, it is desirable to utilize self-tapping screw for securing the side and end bumper strips to the side and end frame sections. In so doing, the self-tapping screws slightly distort the stiffening means and as the fasteners are threaded therein they tend to flatten out the stiffening means slightly. This construction provides excellent clamping means since the stiffening means has some inherent resiliency that tends to force the inside face of the side and end bumper strips against the outside face of the side and end sections of the support means. This construction further minimizes any unsightly and unsanitary gaps between the bumper strips and the support means.

Accordingly, it is an object of the present invention to provide an improved rolling cart that is more readily maintained in a highly sanitary condition.

It is another object of the present invention to provide a rolling cart, as described above, having an improved bumper assembly that may readily be maintained in a highly sanitary condition.

It is a further object of the present invention to provide an improved bumper assembly for a rolling cart, as described above, wherein the outside surface of the bumper means is devoid of any openings or the like that may become contaminated.

Yet another object of the present invention is to provide an improved bumper assembly for a rolling cart, as described above, wherein nuts are formed integrally during the molding of the corner bumper sections in order to permit the assembly of fasteners from the inside of the support frame.

Still another object of the present invention is to provide an improved bumper assembly for a rolling cart, as described above, wherein stiffening means are included.

An additional object of the present invention is to provide an improved bumper assembly for a rolling cart, as described above, wherein the need for preformed, counterbored holes is obviated.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective, exploded view, partially broken away and partially in section, illustrating one embodiment of the present invention;

FIG. 2 is a fragmentary, transverse sectional elevational view taken along line 2—2 of FIG. 1;

FIG. 3 is a fragmentary, perspective view, illustrating typical stiffening means that may be used with the present invention;

FIG. 4 is a fragmentary, perspective view, illustrating the construction of the side and end bumper strips according to the present invention with the stiffening means inserted therein;

FIG. 5 is a fragmentary, sectional plan view taken only line 5—5 of FIG. 1; and

FIGS. 6 and 7 are fragmentary views, illustrating alternative embodiments of the corner bumper member of the present invention.

In the various figures of the drawing, like reference characters designate like parts.

DESCRIPTION OF THE PREFERRED EMBODIMENT

Referring now to FIG. 1 of the drawings, there is shown an improved bumper assembly 10 comprising the present invention. The bumper assembly 10 comprises a pair of spacedly opposed side sections 12 and a pair of spacedly opposed end sections 14. The side and end frame sections 12 and 14 which are generally L-shaped may be made from any suitable material such as aluminmum or stainless steel and are each comprised of a horizontal portion 16 and a vertical portion 18. For purposes of this description, it should be noted that the vertical sections 18 each have an inner surface 20 and an outer face 22.

A plurality of posts 24 extend upwardly from the ends of the side frame sections 12 in order to support the remaining portion of a rolling cart (not shown). In addition, a swivelable and rollable castor assembly 26 is secured, in any suitable manner, in each of the four corners defined by the side and end frame sections 12 and 14. A pair of spacedly opposed side bumper strips 28 and a pair of spacedly opposed end bumper strips 30, are secured, in a manner to be described more fully hereinafter, to the side and end sections 12 and 14 of the bumper assembly 10. It should be noted at this time that the side and end bumper strips 28 and 30 are shorter in length than the side and end sections 12 and 14, respectively, in order to accommodate between adjacent end faces thereof, a resilient, molded corner bumper member 32.

Turning now to FIGS. 2,3 and 4, it will be seen that the bumper strips 28 and 30, which may be made from a suitable resilient material such as natural or synthetic rubber, are each comprised of a flat inner face 34 that abuts the outer face 22 of the vertical section 18 and a generously rounded outer face 36. The side and end bumper strips 28 and 30 are further provided with a longitudinal extending, rectangular opening 38.

A generally V-shaped, resilient stiffening member 42 is positioned within the opening 38. Self-tapping screws 46 extend through openings 48 which are formed in the vertical wall 18. As the screws 46 pass through the openings 48, the screws 46 form a plurality of transverse openings 40 through the inside face 34 of the bumper strips 28 and 30, and then from a plurality of longitudinally spaced apart openings 44 in the stiffening members 42 which are positioned within the bumper strips, as best shown in FIGS. 2 and 4. Washers 50 are utilized between the inner face 20 of the vertical sections 18 and the head of the screws 46.

It will be appreciated that as the screws 46 pass through the openings 48, and are tapping the openings 40 and 44, there will be a tendency for the V-shaped resilient stiffening member 42 to flatten out and exert a force which urges the face 34 of the bumper strips 28 and 30 against the outer face 22 of the vertical wall 18. This construction assures that there will be no gaps for collecting dirt between the side and end frame sections 12 and 14 and the side and end bumper strips 28 and 30.

As shown best in FIG. 5, the corner bumper members 32 are generally L-shaped with the juncture of the two legs 52 and 54 thereof being somewhat thicker than the ends of the legs 52 and 54 as a result of each leg being tapered. Thus, a tangent line 56, when drawn to adjacent corner bumper members 32 on one side or one end of the rolling cart, will define a plane that is further outward than the outermost surface of either the side bumper strips 28 or the end bumper strips 30. In this manner, minimal contact will be permitted between the side and end bumper strips 28 and 30 and any object such as a wall, a post, a door or the like.

It will also be seen in FIG. 5 that a generally L-shaped stiffening member 58 is provided within the corner bumper member 32 with the ends of the stiffening member 58 terminating inwardly of the end faces 60 and 62 of the legs 52 and 54, respectively. Thus, the stiffening member 58 is completely encapsulated within the corner bumper member 32. In addition, a plurality of nuts 64 are welded or otherwise suitably secured to the stiffening member 58 so that they too are encapsulated and are non-rotatable. The stiffening member 58 and the vertical section 18 are provided with aligned openings 66 and 68, respectively, in order to receive screws 70. Beneath the head of each screw 70 is positioned a washer 72. By means of the construction just discussed, a smooth corner bumper 32 having an unbroken outer surface is provided with the fastening means therefor being inserted from a position inside the bumper assembly 10. Because there are no exposed recesses, the corner bumper means 32 of the present invention can be maintained in a more sanitary condition than the corner bumper members of the prior art. This structure shown in FIG. 5 may be readily and inexpensively assembled with a minimum of skill and utilizing only conventional tools, thereby reducing the cost of assembly, maintenance and replacement. The corner bumper member 32 may also be made of any suitable resilient material such as natural or synthetic rubber.

In contrast to the embodiment shown in FIG. 5, the alternative constructions of the present invention shown in FIGS. 6 and 7 provide a cavity 73 and a through hole 74 in the corner bumper member 32'. As best shown in FIG. 6, the side walls of the cavity 73 are U-shaped to receive the end of the side or end bumper strip 28 or 30 therein. The portion of the cavity 73 which is positioned adjacent to the vertical section 18 of the frame section is open to allow the end of the bumper strip to be positioned against the vertical section 18. A cavity 73 is provided at both ends of each corner bumper member. The inner back wall or end face 60' of the cavity 73 may be flat with no opening therein similar to FIG. 5, or may be provided with the through hole 74, as set forth below. Thus, the cavity 73 provides a more sanitary condition as the butt joint between the corner bumper member and the bumper sections is now covered. Furthermore, the openings in the bumper sections and the recesses in the corner bumper member are more effectively sealed to prevent dirt, water and vermin from lodging therein.

The through hole 74, when provided in the end face 60', receives a stiffening member 76 which is similar to stiffening member 58. It will be noted in FIG. 7 that the stiffening member 76 terminates inwardly of the end faces 60'. The stiffening member 42' of the side or end bumper strip 28 or 30 may then be made to extend longitudinally outwardly thereof in order to be received in the recess 78 at the open end of the through hole 74 of the corner bumper member. One recess 78 is provided at the ends of each corner bumper member and serves with the cavity 73 to additionally key the side and end bumper strips 28 and 30 to the corner bumper members 32' to thereby minimize any gap therebetween.

As used hereinabove, with reference to the outer surface of the side and end bumper strips 38 and 30 as well as the corner bumper members 32 and 32', the terms "smooth" and "unbroken" refer to a lack of crevices or recesses such as counterbores which are likely to collect dirt particles. Preferably, the outer surface of the side and end bumper strips 28 and 30 as well as the corner bumper members 32 and 32' should be smooth as possible to minimize the collection of dirt particles. However, if desired, there may be a decorative surface pattern, providing of course that there are no recesses, cracks or the like that can entrap dirt particles.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A bumper assembly for a rolling cart and the like, said bumper assembly comprising:
   a. support means including a pair of elongated, spaced apart side and end sections defining a frame having inside and outside peripheral surfaces;
   b. a pair of resilient side bumper strips and a pair of resilient end bumper strips mounted on the outside surfaces of said side and end sections of said support means, respectively, with outwardly facing surfaces of said side and end bumper strips being unbroken;
   c. a plurality of resilient corner bumper members interfitted intermediately in corner spaced defined by adjacent ends of said side and end bumper strips with each of said corner bumper members being disposed between an associated one of said side bumper strips and an associated one of said end bumper strips; and
   d. fastener means having a head section and a shank section for securing said corner bumper members to each corner of said support means defined by adjacent ends of one of said side and end sections of said support means, the head section of each said fastener means being on the inside surface of said support means and said shank section of each said fastener means extending through a portion of said support means and terminating in an interior of said respective corner bumper member, the outwardly facing surface on each said corner bumper member being unbroken.

2. A bumper assembly according to claim 1, wherein said shank section of each said fastener means is threaded and wherein there is further included mating nuts non-rotatingly captured in each said corner bumper member for mating engagement with associated ones said threaded shank sections.

3. A bumper assembly according to claim 2, wherein there is further included an elongated stiffening member contained in each said corner bumper member and associated one of said nuts are secured to each said stiffening member.

4. A bumper assembly according to claim 3, wherein opposite ends of each said stiffening member terminate inwardly of and are enclosed by associated opposite ends of each said corner bumper member.

5. A bumper assembly according to claim 3, wherein said shank section of each said fastener means extends through each said stiffening member when in mating engagement with an associated one of said nuts.

6. A bumper assembly according to claim 1, wherein said corner bumper members are substantially L-shaped to define a pair of legs joined together at a juncture and having opposite free ends, said juncture of said legs being thicker than said opposite free ends of said legs.

7. A bumper assembly according to claim 6, wherein each of said free ends of said legs is provided with cavity means receiving an associated one of said adjacent ends of said side and end bumper strips therein.

8. A bumper assembly according to claim 1, wherein there are further included second fastener means for securing said side and end bumper strips to said side and end sections of said support means, said second fastener means each having a head and a shank with the head of each said second fastener means being on the inside surface of said support means, said shank of said said second fastener means extending through a portion of said support means and terminating in an interior of said side and end bumper strips.

9. A bumper assembly according to claim 8, wherein each said side and end bumper strip has a longitudinally extending opening therein and wherein stiffening means are contained in each said opening.

10. A bumper assembly according to claim 9, wherein said shank section of each said second fastener means is a screw with each said screw being in threaded engagement with an associated one of said stiffening means.

11. A bumper assembly according to claim 9, wherein each said stiffening means is generally V-shaped and is arranged to be engaged and distorted by engagement thereof by said second fastening means to thereby retain said second fastening means.

12. A bumper assembly according to claim 9, wherein opposite ends of said stiffening means are positioned in openings on associated end faces of said corner bumper members.

13. A bumper assembly for attachment to an outside surface of a support member for a rolling cart and the like, the support member being provided with openings extending therethrough from the outside surface to an inside surface thereof, said bumper assembly comprising:

a. a resilient bumper member having an unbroken, outwardly facing surface and an inwardly facing surface;

b. fastener members for securing said inwardly facing surface to the outside surface of the support member, each of said fastener members having a head section and a shank section, said head section being positionable adjacent to the inside surface of the support member with the shank section extending through an associated one of the openings in the support member, said shank section further passing through said inwardly facing surface of said bumper member and terminating in an interior portion of said bumper member between said inwardly and outwardly facing surfaces;

c. holding means positioned within said interior portion of said bumper member for receiving and holding said fastener members to maintain the attachment of said bumper assembly to the support member;

d. said bumper member being substantially L-shaped to provide a pair of legs, adjacent ends of said legs being joined together at a juncture with opposite ends of said legs being free and facing in a perpendicular direction with respect to each other to define a corner bumper member, said juncture being thicker than said opposite ends of said legs, each of said opposite ends of said legs being provided with cavity means for receiving an end of an associated bumper strip therein, and e. a substantially L-shaped stiffening member disposed in said corner bumper member and extending through said juncture, one end of said stiffening member being located within one of said opposite ends of said legs and being disposed adjacent to said cavity means provided therein, an opposite end of said stiffening member being located within the other of said opposite ends of said legs and being disposed adjacent to said cavity means provided therein.

14. A bumper assembly according to claim 13, wherein said shank section of each said fastener members is threaded, said holding means including mating nuts non-rotatingly captured in said bumper member for mating engagement with associated ones of said threaded shank sections.

15. A bumper assembly according to claim 14, wherein said nuts are secured to said stiffening member.

16. A bumper assembly according to claim 15, wherein said shank section of said fastening member extends through said stiffening member when in mating engagement with an associated one of said nuts.

17. A bumper assembly for attachment to an outside surface of a support member for a rolling cart and the like, the support member being provided with openings extending therethrough from the outside surface to an inside surface thereof, said bumper assembly comprising:

a. a resilient bumper member having an unbroken, outwardly facing surface and an inwardly facing surface;

b. fastener members for securing said inwardly facing surface to the outside surface of the support member, each of said fastener members having a head section and a shank section, said head section being positionable adjacent to the inside surface of the support member with the shank section extending through an associated one of the openings in the support member, said shank section further passing through said inwardly facing surface of said bumper member and terminating in an interior portion of said bumper member between said inwardly and outwardly facing surfaces;

c. holding means positioned within said interior portion of said bumper member for receiving and holding said fastener members to maintain the attachment of said bumper assembly to the support member, and to urge said inwardly facing surface of said bumper member against the outside surface of the support member;

d. said bumper member being a strip having a longitudinally extending rectangular aperture therethrough;

e. said holding means including a generally V-shaped resilient stiffening member disposed in said aperture, a longitudinally extending center portion of said stiffening member being disposed closer to said outwardly facing surface of said bumper member than opposite longitudinally extending edges of said stiffening member which are directed toward said inwardly facing surface of said bumper member, said aperture having a larger rectangular cross-section than V-shaped cross-section of said stiffening member; and f. said shank section of each of said fastener member including self-tapping screw means for tapping through said inwardly facing surface of said bumper member and through said center portion of said stiffening member for threaded engagement with said stiffening member, whereby each of said longitudinally extending edges of said stiffening member is forced toward said inwardly facing surface of said bumper member to urge said inwardly facing surface of said bumper member against the outside surface of the support member.

* * * * *